United States Patent Office

2,803,521
Patented Aug. 20, 1957

2,803,521

METHOD OF TREATING SPENT METALLIC REACTION MASSES FROM THE DIRECT PROCESS PRODUCTION OF ORGANOHALOSILANES

Siegfried Karl Nitzsche and Erich Georg Schmidt, Burghausen, Upper Bavaria, Germany, assignors to Wacker-Chemie G. m. b. H.

No Drawing. Application February 19, 1953, Serial No. 337,868

Claims priority, application Germany March 5, 1952

6 Claims. (Cl. 23—97)

The present invention relates to methods of separating relatively pure metallic components from the spent metallic reaction mass obtained from the direct process production of organosilanes.

By the term "direct process" in this application is meant the well-known reaction of silicon, usually in admixture or alloyed with catalysts such as copper and other metals or metal salts, with a halohydrocarbon to produce volatile organohalosilanes. This reaction leaves part of the silicon and most of the catalyst in a spent residual mass.

The reaction of methyl chloride and silicon at 200–500° C., usually in the presence of copper or copper chloride and often with HCl as an added reactant, is the best known and most widely used commercial application of the direct process reaction. This particular reaction produces various methylchlorosilanes such as $CH_3SiCl_3$, $(CH_3)_2SiCl_2$, $(CH_3)_3SiCl$, and $CH_3HSiCl_2$. As is well-known, however, the direct process is applicable to a wide variety of halohydrocarbons, e. g., of the alkyl, aryl, substituted aryl, and unsaturated type, and the present invention is directed toward the treatment of metallic masses from any of these direct process reactions. The reactions in question can be carried out in either batch-wise or continuous types of reactors by well-known methods, and the present invention is not limited to the treatment of spent masses from any particular type of equipment.

In the aforesaid direct process reaction, the amount of silicon in the metallic reaction mass is steadily depleted as the reaction proceeds until a point is reached at which the yield of organohalosilane product is very poor, and it is uneconomical to continue the reaction even though a substantial portion of the silicon remains unreacted. Consequently, it is necessary to provide a fresh mass of silicon at this point. The spent metallic mass is not usable per se and in the past has usually been discarded.

It is an object of this invention to provide a method for recovering the metallic silicon from the above described spent metallic mass, and to recover other valuable metals or salts thereof which may have been added as catalysts or catalyst activators. It is a further object to separate the various metallic constituents of the spent mass in a form such that the constituents are directly usable in new direct process reaction masses.

It has been found that the spent reaction mass obtained from the reaction of halohydrocarbons with silicon (in admixture or alloyed with copper and/or copper chlorides, or iron, nickel, cobalt, or other catalysts) can be separated by the process of the present invention so that the residual silicon can be removed in a relatively pure form and the various other metals as the metallic salts. The constituents of the mass therefore are obtained in a form in which they are immediately reusable as raw materials for a fresh reaction mass.

The method of the present invention comprises dispersing the spent metallic reaction mass in water or dilute hydrochloric acid and contacting the dispersed mass with chlorine at a temperature of from 20–100° C., preferably at about 75–80° C. The copper in the spent mass is thus converted into cupric chloride and retained in solution along with any other water soluble metal chloride products. The silicon, with the exception of the very finest particles which oxidize to silicic acid, is maintained unchanged. The coarse silicon particles are then allowed to settle or are otherwise separated from the supernatant solution of metal salts, and are washed with water and dried. This silicon is substantially pure and can be re-used directly in the direct process reaction, or, if desired, can be first alloyed or admixed with suitable catalysts before being re-used in the direct process.

The metal salts in the supernatant solution are then partially or wholly reduced with any suitable reducing agent, e. g., sulphur dioxide, sodium bisulfite, or sodium sulphite. This reduction is best carried out at a temperature of from 20–90° C., preferably at about 80° C. The solution is then neutralized with a suitable alkaline material such as sodium hydroxide and allowed to cool, thus precipitating out cuprous chloride. The cuprous chloride can be washed and dried (preferably under nitrogen) and used directly as fresh catalyst in the direct process.

Catalytic metals other than copper and which are capable of forming water soluble chlorides can then be separated by adding sodium hydroxide, calcium hydroxide, or sodium carbonate to the mother liquor from the cuprous chloride precipitation. This will cause the precipitation of the aforesaid catalytic metals such as iron, cobalt, or nickel, as the respective hydroxides, carbonates, or basic carbonates. These metals can be obtained in pure form from the precipitates by the usual methods after washing, filtering, drying, and if desired, calcining.

The original spent metallic reaction mass can be crushed or broken up by any suitable means in order to facilitate its dispersal in the water or dilute hydrochloric acid. Whether this is necessary or not depends, of course, on the nature of the mass as it is removed from the reactor.

These spent metallic masses may contain varying amounts of carbon formed by the decomposition of the organic reactants. The amount of such carbon present will depend upon such factors as the temperature at which the reaction has been conducted, the type of reactants, and the degree to which the mass has been depleted of its silicon content. It is sometimes desirable to burn off such carbon particles prior to dispersing the mass in water. The burning of such carbon can be carried out in any conventional furnace. The nature of the aforesaid carbon is often such that it need not be burned off prior to carrying out the practice of this invention, however. Any carbon present is often in the form of a soot which can be washed away as the first step in the process or which can be decanted or filtered off from the cuprous chloride solution. Any carbon which remains in the precipitated silicon can be easily washed off with water.

It has been indicated above that either water or dilute hydrochloric acid can be used for dispersing the spent metallic mass. It is to be understood that the reaction can proceed satisfactorily without the presence of hydrochloric acid. However it is preferable, in order to speed up the rate of reaction, to conduct the chlorination in a dispersion in dilute hydrochloric acid. An HCl content of from 2 to 5 percent has been found preferable. Higher or lower concentrations may be used, however, since the concentration of HCl is in no way critical to the invention.

The following examples are illustrative only of the manner in which the method of the present invention is to be carried out.

*Example 1*

The metallic reaction mass employed in this example was a mixture of a silicon-copper-iron alloy and cuprous chloride. Prior to its use in the direct process reaction, the silicon mass contained about 20 percent copper and 6 percent iron. The spent reaction mass obtained from this starting material contained about 50 percent copper and 15 percent iron along with the unreacted silicon and minor amounts of carbon. 100 kilograms of this spent reaction mass was suspended with stirring in water which was weakly acidified with HCl. The suspension was heated to 60° C. and gaseous chlorine was introduced at a rate of about 2 kilograms per hour, whereupon the temperature rose to about 75° C. as a result of the exothermic reaction. After about 24 hours the temperature fell, and chlorine was no longer absorbed. When the agitation was stopped, coarse particles of silicon settled out as a sludge and the supernatant solution was drawn off. The sludge was washed with water and dried. Depending upon the nature of various residues treated in this manner, from 80 to 95 percent of the silicon present is recovered. The supernatant solution of metal salts was filtered and mixed at 75° C. with an aqueous solution of sodium bisulfite in the amount required for the reduction. The solution was then neutralized with a strong sodium hydroxide solution and cooled. The solution appearing above the resulting precipitated cuprous chloride was decanted, and the salt was washed with water. After filtration and drying in the absence of air, e. g., under nitrogen, pure cuprous chloride was obtained in a yield of 85 to 90 percent of theory.

*Example 2*

Reaction masses similar to that employed in Example 1 were employed in this example, except that in addition to the copper and iron, about 6 percent of nickel and cobalt respectively were present as catalytic metals. These reaction masses were worked up as in Example 1. The mother liquor from the cuprous chloride precipitation was found to contain small amounts of copper and iron and nickel or cobalt in the form of salts. The latter metals were removed by adding sodium hydroxide, calcium hydroxide, or sodium carbonate, until the solution remained alkaline and no more precipitate formed. These precipitates consisted of hydroxides, carbonates, or basic carbonates of iron, copper, cobalt, and nickel. The precipitates were filtered, washed, and dried, and the pure metals obtained from the salts and hydroxides by conventional methods.

That which is claimed is:

1. The method of separating silicon and copper from the spent metallic reaction mass obtained from the direct process reaction of a halohydrocarbon with silicon in the presence of a copper catalyst for the reaction, which comprises dispersing the spent mass in water, contacting the dispersed mass with chlorine at a temperature of 20–100° C. until substantially all of the copper is converted to cupric chloride, separating the relatively pure silicon from the supernatant solution of soluble metal chlorides, reducing the cupric chloride present in the acidic supernatant solution to cuprous chloride, neutralizing the resulting solution of cuprous chloride, and separating the resulting precipitated cuprous chloride.

2. The method of claim 1 wherein the reduction of cupric chloride is carried out by the addition of a reducing agent selected from the group consisting of sulfur dioxide, sodium bisulfite and sodium sulfite.

3. The method of claim 1 in which the water is rendered acid with HCl prior to the introduction of chlorine.

4. The method of separating silicon, copper, and other metals capable of forming water-soluble chlorides from the spent metallic reaction mass obtained from the direct process reaction of a halohydrocarbon with silicon in the presence of copper and a metal catalyst for the reaction other than copper, said metal catalyst other than copper being selected from the group consisting of iron, cobalt, and nickel, comprising dispersing the spent mass in water, contacting the dispersed mass with chlorine at a temperature of 20–100° C. until substantially all of the copper is converted to cupric chloride, separating the relatively pure silicon from the supernatant solution of soluble metal chlorides, reducing the cupric chloride present in the acidic supernatant solution to cuprous chloride, neutralizing the resulting solution of cuprous chloride, separating the precipitated cuprous chloride from the neutralized solution, adding an alkaline agent selected from the group consisting of sodium hydroxide, calcium hydroxide and sodium carbonate to the neutralized solution, and separating the resulting precipitate containing the said metal catalyst other than copper.

5. The method of claim 4 wherein the reduction of cupric chloride is carried out by the addition of a reducing agent selected from the group consisting of sulfur dioxide, sodium bisulfite and sodium sulfite.

6. The method of claim 4 in which the water is rendered acid with HCl prior to the introduction of chlorine.

References Cited in the file of this patent

UNITED STATES PATENTS

| | | |
|---|---|---|
| 589,415 | Chalmot | Sept. 7, 1897 |
| 602,632 | De Chalmot | Apr. 19, 1898 |
| 704,640 | Hoepfner | July 15, 1902 |
| 1,386,227 | Becket | Aug. 2, 1921 |
| 1,915,152 | Calcott et al. | June 20, 1933 |
| 2,049,402 | Uernlund | July 28, 1936 |

OTHER REFERENCES

Mellor "Comprehensive Treatise on Inorganic and Theoretical Chemistry," vol. 6, page 191. Longmans, Green and Co., New York, N. Y., 1925.